United States Patent [19]
Francis

[11] 3,915,221
[45] Oct. 28, 1975

[54] APPARATUS FOR STORING PERISHABLE MATERIAL

[75] Inventor: William M. Francis, Portland, Oreg.

[73] Assignee: Industrial Refrigeration & Equipment Company, Portland, Oreg.

[22] Filed: Feb. 21, 1974

[21] Appl. No.: 444,307

Related U.S. Application Data

[62] Division of Ser. No. 162,777, July 15, 1971, Pat. No. 3,877,512.

[52] U.S. Cl. .......................... 165/20; 165/19; 165/3
[51] Int. Cl.² ............................................ F24F 3/14
[58] Field of Search ............................ 165/3, 19, 20

[56] References Cited
UNITED STATES PATENTS

| | | | |
|---|---|---|---|
| 2,093,936 | 9/1937 | Spielmann | 165/20 |
| 2,419,119 | 4/1947 | Christensen | 165/19 |
| 2,835,476 | 5/1958 | Kohut, Jr. | 165/20 |

*Primary Examiner*—Charles J. Myhre
*Assistant Examiner*—William C. Anderson

[57] ABSTRACT

This invention relates to apparatus and method for the storing of a perishable commodity or a perishable material such as food.

The perishable commodity is stored in an atmosphere which varies over a small temperature range and also varies over a small range of relative humidity. The relative humidity may be a high relative humidity.

This invention makes it possible to easily control the temperature in this atmosphere for storing the perishable commodity.

13 Claims, 5 Drawing Figures

APPARATUS FOR STORING PERISHABLE MATERIAL

This application is a divisional application of my copending application Ser. No. 162,777 and now U.S. Pat. No. 3,877,512, filing date of July 15, 1971, entitled APPARATUS AND METHOD FOR STORING PERISHABLE MATERIAL.

The storing of a perishable commodity, such as food, for a relatively long period of time is a difficult problem. It is necessary to provide a storage atmosphere. This storage atmosphere must be carefully maintained. For example, the storage atmosphere must be maintained within a relatively narrow temperature range. Also, the storage atmosphere must be maintained within a relatively narrow relative humidity range. In certain instances extraneous gasses may be introduced into the atmosphere to slow the physiological change of the food. For example, there may be introduced into the atmosphere carbon-dioxide, ethylene oxide or other gasses to slow the maturing or ripening of the food in storage.

For example, it is desirable to store potatoes for approximately 12 months. This makes it possible to process the potatoes the entire year. The investment for the processing equipment is less than if potatoes can be stored only 4 months and must be processed within this 4 month period.

Potatoes are a staple food and have been stored in many ways. One way potatoes have been stored and are stored is in barrels. The barrels are small units. The barrels can be stored in warehouses or in ground cellars or other appropriate housings. By storing the potatoes in barrels to spoilage and the rotting of the potatoes is localized. If rot occurs the rot may be limited to one barrel or only a few barrels of potates.

Another way of storing potatoes is in burlap bags. Again, the burlap bags are small storage units. The burlag bags may be stored in a warehouse, in a ground cellar or in other suitable housings. Again, if spoilage of potatoes occurs the spoilage may be limited to one bag of potatoes or a few bags of potatoes.

Still another way of storage of potatoes is in bins or piles. There may be a large warehouse and the potatoes may be stored in bins, 6-feet, 8-feet, 10-feet or 17-feet in height. Or, the potatoes may be stored in piles 6-feet, 8-feet, 10-feet or 17-feet in height, for example.

Usually, for the above described ways of storing potatoes the potatoes in storage are subject to the outside atmosphere. The warehouse is not heated. The ground cell or root cellar is not heated. If the outside temperature varies the temperature in the warehouse or root cellar will vary. Generally, speaking, the potatoes are harvested in the fall at the time of harvest when the temperature may vary from approximately 50°F. to 70°F. The relative humidity may vary from approximately 20 percent relative humidity to about 90 percent relative humidity, depending upon the area of the world in which the potatoes are being harvested. In winter, the potatoes are stored in the warehouse or in the ground cellar and are subject to the outside temperatures. The outside temperatures may be relatively warm such as 30°F. or 40°F. Or, the outside temperatures may be relatively cold such as minus 20°F. or minus 30°F. The temperature in the warehouse or in the ground cellar will correspond closely to the outside temperature. Also, the relative humidity in the warehouse and in the ground cellar will correspond closely to the relative humidity of the outside atmosphere. Further, the relative humidity of the outside atmosphere may vary considerably. At certain times, the relative humidity may be close to 100 percent and, likewise, the relative humidity in the warehouse or the ground cellar will be similar to that. If the outside temperature suddently falls from approximately 50°F. to approximately 10°F. the relative humidity at about 10°F. will be close to 100 percent. But, after a few days of about 10°F. the relative humidity has decreased. Further, during the winter, when potatoes are stored, and also into the spring, the ambient temperature of the atmosphere varies over a relatively wide temperature range, alternately heating and cooling, many times during the fall, winter and spring. Likewise, the relative humidity of the ambient atmosphere varies considerably during the fall, winter and spring. The varying temperature and the varying relative humidity of the ambient atmosphere, and also of the atmosphere in the warehouse and ground cellar, has an effect on the food in storage and on potatoes in storage.

As is well known potato is essentially a starch with a tough skin. A critical temperature for the potato is about 45°F. If the temperature of the potato is reduced to a temperature less than approximately 45°F., possibly, less than about 43.5°F., the starch in the potato converts into a sugar. However, above about 43.5°F. or, approximately, 45°F. the starch in the potato remains a starch. If the potato is to be used to make fried potatoes, such as shoestring potatoes and potato chips, it is desirable to store the potato above about 45°F. If the potato contains sugar, the sugar in the deep fat frier burns and turns brown and the potato, shoestring potato or potato chips, all have a streaked brown color which quite often is a dark brown. Therefore, it is desirable from a commercial utilization standpoint to store the potato at a temperature above about 45°F. A desirable temperature for the storing of potatoes which will be fried is a temperature in the range of about 45°F. to approximately 50° F. If the potatoes in storage are to be used for seed potatoes it is desirable to have the potatoes at a temperature in the range of about 38°F. to about 40°F. Further, it is desirable to have the temperature of the potatoes in storage at a constant temperature and not a fluctuating temperature. If the potatoes in storage are stored at approximately 38°F. and then, suddenly, placed in an atmosphere where the temperature is much above 38°F. there is a physiological change in the potatoes and the potatoes begin to sprout.

In regard to relative humidity if the relative humidity of the atmosphere in which the potato is stored is a high humidity there is less shrink of the potato. For example, if the atmosphere has a low relative humidity there may be a 17 percent shrink of the potato. This means a 17 percent potato for commercial utilization. As previously stated, the potato has a tough skin. If the relative humidity of the atmosphere in which the potato is stored in a low relative humidity there is a quite large driving force for the transfer of moisture from inside the potato, through the tough skin and to the atmosphere. Therefore, it is desirable to have a high relative humidity for the atmosphere in which the potato is stored so as to lessen the transfer of the moisture from inside the potato and through the tough skin and into said atmosphere. In this regard, it is desirable to have the relative humidity of the atmosphere in the range of approximately 96 to 98 percent relative humidity. If the potato is bruised there is the possibility of the potato rotting. If the relative humidity of the atmosphere in which the potato is stored is a low relative humidity there is a greater possiblity of rotting of the potato in the bruised area. Therefore, it is desirable, to lessen the possibility of rot, to have a relatively high relative humidity for the atmosphere. Further, rot in the potato spreads in storage by physical contact with water. If the potatoes are in contact with a pool of water there is a greater possiblity of the spread of rot than if the potatoes are not in contact with the pool of water. This leads to a critical situation whereby it is desirable to have a high relative humidity in the atmosphere in which the potatoes are stored but to have no pools of water in any contact with the potatoes. This is possible by the careful introduction of moisture into said atmosphere. The moisture must be introduced as very fine droplets and not as large droplets. Upon being introduced as very fine droplets the atmosphere readily absorbs the moisture.

In order to achieve a substantially constant temperature in a narrow temperature range and a substantially constant relative humidity in a narrow relative range it is necessary to have a number of thermal couples in the housing where the perishable food is stored and also to have a number of sensors for sensing the relative humidity of the atmosphere. An operator, normally, must view the readings from each of these thermal couples and the readings of each of the relative humidity sensors and then adjust equipment for controlling the temperature of the atmosphere and the relative humidity in the atmosphere. This operation requires a high degree of competance on the part of the operator. In many areas the potatoes are stored in a rural area. The operator may be a farmer who has not been trained to adjust the temperature and the relative humidity of the storage atmosphere and does not have the competance to take the temperature readings from many thermal couples and the relative humidity readings from many humidity sensors and adjust the equipment for reaching the desired temperature and relative humidity in the storage atmosphere. The subject invention is directed to a method and apparatus making it possible for a person with a limited technological background in the blending of temperatures and relative humidity to operate a storage facility and for maintaining the atmosphere in such storage facility at a desired temperature and at a desired relative humidity. In this invention it is possible to preset the control for the relative humidity of the atmosphere to a desired relative humidity, say 96 to 98 percent relative humidity. This control for the relative humidity need not be adjusted after it has been preset. Then, there is a control for the temperature in the storage atmosphere. The operator can adjust the controls for the temperature to a desired temperature. In effect, the operator, such as a farmer, need adjust only one control to realize and maintain the desired temperature and relative humidity in the storage atmosphere. This makes it possible to store for a relatively long period of time a perishable commodity such as a potato. The potato may be stored for approximately 12 months. Further, this makes it possible to store the perishable commodity in many areas of the world. In some areas of the world the atmosphere outside the storage atmosphere may have a high temperature and a high humidity; or, may have a low temperature and a low humidity. For these wide extremes of temperature and humidity it is possible to use the method and apparatus of this invention to store a perishable commodity such as potatoes for a relatively long period of time, approximately 12 months.

The value of this can be readily seen when it is considered that in storage, by methods and apparatus used prior to this invention, that the rotting and the spoiling of potatoes amounted to approximately 15 percent of potatoes in storage coupled with this spoiling of the potatoes in the shrink factor of about 17 percent. Under these conditions there may be a loss of about 30–32 percent. And, under exceptional adverse conditions I have seen a 100 percent loss of potatoes in storage. Prior to this invention many farmers stroing potatoes could expect a loss of about 17–20 percent of the potatoes each year. If the rotting and spoiling of potatoes can be decreased by a considerable percentage due to the teachings of this invention it is seen that considerable food can be used for feeding people and livestock. An example of some areas of the world and the amount of acreage used for the planting of potatoes is as follows. In the United States it is estimated that 2,000,000 acres are planted with potatoes each year. In the Union of Soviet Socialistic Republics it is estimated that 28,000,000 acres of potatoes are planted each year. In Western Europe it is estimated that 16,000,000 acres of potatoes are planted each year. If the spoiling and rotting of potatoes can be reduced by a relatively high percentage by better storage methods and apparatus it is seen that many tons of potatoes are made available for feeding to human beings and to livestock.

An obvious advantage of this invention is to provide methods and apparatus for the storing of perishable commodity such as potatoes for a relatively long period of time; a further important object is to provide, essentially, one control for controlling the temperature of the atmosphere in which the perishable commodity is stored; a further object is to provide one control which is preset for the desired relative humidity of the atmosphere in which the perishable commodity is stored; another object is to provide one control which, essentially, simultaneously regulates the humidity and temperature of the atmosphere in which the perishable commodity is stored; a further and important object is to provide method and apparatus which can be used in many areas of the world for storing a perishable commodity; an additional object is to provide a package system which can be readily installed for controlling the atmosphere in which a perishable commodity is stored; another important object is to provide method and apparatus for storing a perishable commodity, such as potatoes for a specific use such as processed potatoes which are to be fried, potatoes which are not to be processed but are to be baked or boiled, or potatoes which are to be used as seed potatoes; another object is to provide a method and apparatus which lessens spoiling and rotting of a perishable commodity such as potatoes while in storage; another object is to provide method and apparatus which lessens the sprouting of potatoes while in storage; another object is to provide apparatus which makes it possible to maintain a relatively close temperature control, a range of about 1°F., in a storage atmosphere for storing a perishable commodity such as potatoes; an additional object is to provide an apparatus which makes it possible to control the relative humidity of a storage atmosphere for storing a perishable commodity such as potatoes and which relative humidity may vary over a wide range approximatley 75 to 99 percent relative humidity with a deviation of only approximately 1 percent relative humidity even through the relative humdity is a high relative humidity of approximately 96 to 98 percent relative humidity.

These and other important objects and advantages of the invention will be more particularly brought forth upon reference to the accompanying drawings, a detailed description of the invention and the appended claims.

Figure 1:
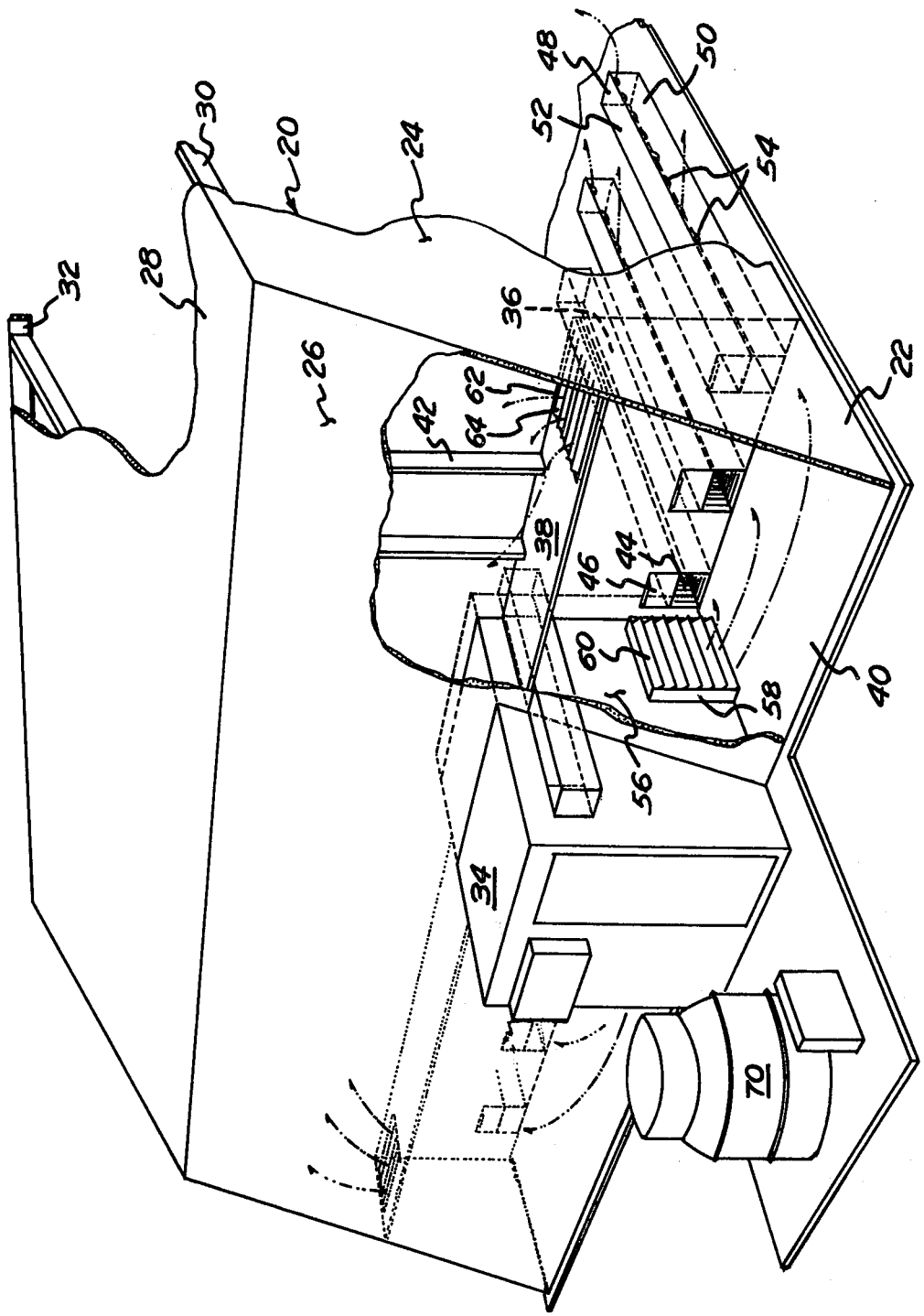
FIG. 1 is a perspective fragmentary view of a storage warehouse and illustrates the processing facilities for cooling, heating, and humidifying an atmosphere for use in the storage warehouse, and also illustrates the laterals for delivering the adjusted atmosphere near the floor of the warehouse.

A storage warehouse may be used to store a perishable commodity such as food, viz., potatoes. In FIG. 1 there is illustrated a storage warehouse 20 having a floor 22, an endwall 24, a side-wall 26 and a roof 28. There may be used conventional construction such as rafter 30 and a ridgepole 32.

The storage warehouse 20 is insulated and weatherproofed so as to have a low coefficient for heat transfer through the walls and also a low transfer of moisture through the walls.

There is a control section 34. The control section 34 is partly within the warehouse 20 and partly outside of the warehouse 20.

In FIG. 1 there is seen that there is an interior wall 36 which joins with a top 38.

The side-wall 26, the base or floor 22, the interior wall 36, the end 24 and the top 38 define an air plenum 40.

The wall 36 may include upright stud 42.

In the wall 36 it is seen that there are a number of openings 44 having a door 46 for varying the size of the opening.

The opening 44 connects with a lateral suppply duct 48. In the duct 48 has sidewalls 50 and a top 52. The sidewalls 50 are a number of openings for passageways 54.

The control housing 34 has a side-wall 56. In the side-wall 56 is an opening 58. The opening 58 may be covered by a louver or damper 60.

In the ceiling 38 of the plenum 40 there is an opening 62 having a gravity operated damper 64. The damper 64 allows air to escape from the plenum to the upper part of the storage warehouse 20 and to act as an insulating curtain between the upper part of sidewalls 26 and the roof 28 and the interior of storage warehouse 20.

The control housing 34 contains the processing equipment and the controls for the processing equipment for heating an atmosphere, cooling an atmosphere, adding moisture to an atmosphere and indicating the temperatures in various parts of the warehouse 20.

Figure 2:
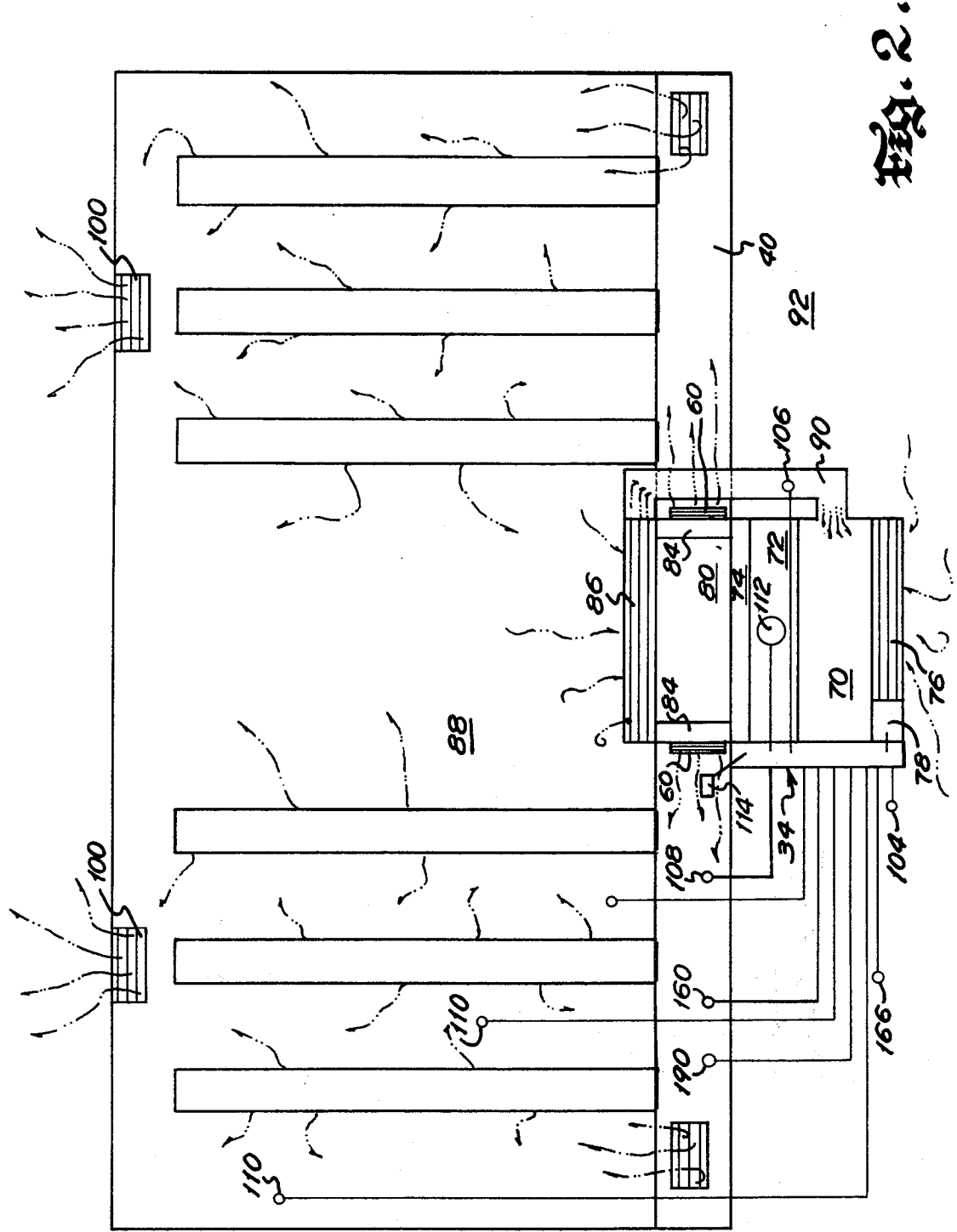
FIG. 2 is a schematic plan view illustrating one floor plan for a warehouse and illustrates the laterals for admitting an adjusted atmosphere near the floor of the warehouse and also illustrates, in schematic form, the humidfying means, the heating and the cooling means for the adjusted atmosphere.

As is schematically illustrated in FIG. 2 there is a cooling means 70 or a cooling section 70.

Also, there is a humidifying means or a humidifying section 72. Further, there is a heating means 74 or a heating section 74.

There is a louver or damper 76 for controlling the flow of air to the cooling means 70. The louver-damper 76 is operated by a motor 78. The motor 78 is controlled by a control unit, which will be described in a later part of this specification.

There is a chamber 80 having a side wall 56 with openings 58. A fan 84 may blow the contents of the chamber 80 through the openings 58 and the louver or damper 60.

In the storage area of the warehouse 20 there is a chamber or housing 86 for recirculating an atmosphere 88 in the storage warehouse 20. The chamber of housing 86 by means of a conduit 90 connects with the cooling means or cooling section 70.

It is to be understood that the louver or damper 76 connects with the cooling means 70 or controls the flow of air to the cooling means 70. Also, the cooling means 70 connects with the humidifying means 72. The humidifying means 72 connects with chamber 80. The heater 74 may be in the chamber 80. Or, to phrase this differently, air entering from the atmosphere outside of the warehouse 20, viz., referred to as a second atmosphere 92, enters through the louver or damper 76. The second atmosphere 92 may flow through the cooling means 70 and through the humidifying means 72. The second atmosphere 92, if necessary, may be processed in the humidifying means 72 so as to have a higher relative humidity upon leaving the humidifying means 72 as compared to when it entered the humidifying means 72 to form an adjusted atmosphere. The adjusted atmosphere upon entering the chamber 80 may be heated so as to have its temperature elevated to a desired temperature. From the chamber 80 the adjusted atmosphere may be blown by the fans 84 through the damper 60 and into the plenum 40. Or, the first atmosphere 88 may flow into the chamber 86, through the conduit 90 and into the cooling means 70. If necessary, in the cooling means 70 the atmosphere 88 may be coooled to a desired temperature. Then, in the humidifying means 72 the atmosphere 88 may be treated with water, droplets of water of very small size, so as to have the relative humidity increased. The atmosphere 88 then can flow to the chamber 80. At this point the atmosphere 88 may be considered to be an adjusted atmosphere as the temperature has been changed and the humdity, may have been changed. In the chamber 88 the adjusted atmosphere may be blown by the fans through the damper 60 and into the plenum 40. Sometimes, instead of cooling the adjusted atmosphere 88 it may be desirable to heat the atmosphere 88. Therefore, after the atmosphere 88 has been treated into the humidifying means 72 to form an adjusted atmosphere the heater 74 may heat the atmosphere, an adjusted atmosphere, before this adjusted atmosphere is blown through the damper 60 and into the plenum 40.

Essentially, when necessary, the cooling means 70 will cool an atmosphere such as an atmosphere 88 or an atmosphere 92 or add moisture to the atmosphere or, if necessary, heat the atmosphere to make an adjusted atmosphere for introduction into the storage warehouse 20 and for introduction into the atmosphere 88 in the storage warehouse 20. Essentially, the control housing houses the equipment for processing the atmosphere 88 or the atmosphere 92 for maintaining a desired temperature in the warehouse 20 and a desired relative humidity in the warehouse 20. For the storing of potatoes the desired temperature is in the range of 35° to 65°F. and the desired relative humidity is in the range of about 75 percent to approximately 99 percent relative humidity.

In the storage warehouse 20 it is desirable to maintain a constant temperature and a constant relative humidity for the atmosphere 88. The potatoes will be brought from the field and placed in the warehouse 20. If the potatoes are brought in in the late summer or early fall the temperature of the potatoes may range as high as 75° to 85°F. If the potatoes are to be stored for a relatively long period of time, viz., three months to twelve months, in order to be used for processed potatoes then the temperature of the atmosphere 88 should be in the range of approximately 45° to 50°F. If the potatoes are to be stored for longer than 3 months and are to be used as seed potatoes then the temperature of the atmosphere 88 should be approximately 38°F. to about 40°F. If the temperature of the potato, when brought in from the fields, is at a temperature greater than about 50°F. it is necessary to cool the potato to a temperature less than about 50°F. Assume, that the days are relatively warm, about 75°F. and the temperature at night drops to about 60°F., then it is necessary to cool the atmosphere 88. Also, assume that the relative humidity in the atmosphere 88 is approximately 80 percent and that the potatoes upon being placed in the storage warehouse 20 are dry. Assume that the potatoes have been placed dry in the warehouse 20 and are to be maintained in the warehouse 20 for approximately longer than 3 months and are to be used for processed potatoes. Under these circumstances the louver or damper 76 will be closed. For storing the potatoes for processing the relative humidity of the atmosphere 88 should be in the range of about 96 percent to about 98 percent and the temperature should be in the range of about 45°F. to 50°F. This set of conditions can be realized for the atmosphere 88 by recirculating part of the atmosphere 88 through the chamber 86, the conduit 90 and to the cooling means 70. The cooling means 70 is a refrigeration means and will refrigerate the atmosphere 88 or the adjusted atmosphere being processed. Then, in the humidifying means the atmosphere is treated with moisture vapor so as to raise the relative humidity of the adjusted atmosphere to a relative humidity in the range of about 96 percent to 98 percent. Then, the adjusted atmosphere is blown through the damper 60, the plenum 40 and into the atmosphere 88. It is seen, that in time, the atmosphere 88 will be modified so as to assume relative humidity in the range of about 96 percent to about 98 percent relative humidity and to have a temperature in the range of about 45°F. to 50°F. If the potatoes in the storage warehouse 20 are to be stored for seed potatoes then the temperature in the atmosphere 88 would be adjusted to be in the range of about 38°F. to approximately 40°F.

Assume that the potatoes being stored in the warehouse 20 are moist and are wet and are at a temperature greater than about 50°F. Under these circumstances the atmosphere 88 would be recirculated through the chamber 86 and the conduit 90 to the cooling means 70 and the temperature of the atmosphere lowered. If the relative humidity of the adjusted atmosphere is less than about 80 percent then in the humidifying means 72 the relative humidity would be increased to approximately 80 percent. If the relative humidity were greater than about 80 percent the adjusted atmosphere would not be modified in the humidifying means 72. By maintaining the relative humidity of the adjusted atmosphere in the range of about 80 percent the atmosphere 88 is modified and the moisture on the potatoes evaporates. This removal of the moisture on the potatoes in the storage warehouse 20 lessens the possibility of rot. After the free moisture has been evaporated from the potatoes in the storage warehouse 20 then it is possible to raise the relative humidity of the adjusted atmosphere to a value in the range of about 96 percent relative humidity and about 98 percent relative humidity. Again, in time the temperature of the atmosphere 88 will become that in a desired range of approximately 45°F. and about 50°F. or in the desired range from approximately 38°F. to about 40°F., and the relative humidity will be that in the desired range of about 96 percent relative humidity to 98 percent relative humidity.

Potatoes, in storage, give off heat. For example, one ton of potatoes stored at a temperature in the range of about 36°F. to approximately 40°F. will give off approximately 1,300 to 1,800 BTU's per 24 hours; stored in the temperature range of about 45°F. to about 50°F. a ton of potatoes will give off approximately 1,400 BTU's every 24 hours; and, a ton of potatoes stored at approximately 60°F. will give off, approximately, 1,500 to 2,600 BTU's per 24 hours. This means that in a storage warehouse 20, and with the temperature of the second atmosphere 92 above approximately 50°F., it will be necessary, from time to time, to cool the first atmosphere 88 in the storage warehouse 20. Naturally, with the potatoes giving off heat and the first atmosphere 88 in contact with the potatoes, the temperature of the first atmosphere 88 will rise. In order to hold the temperature of the first atmosphere 88 in the desired temperature range, of the desired range of approximately 45°F. to about 50°F. or approximately 38°F. to about 40°F., it will be necessary to cool the first atmosphere 88 to make an adjusted atmosphere for blowing through the plenum 40 and into the first atmosphere 88. In essence, the first atmosphere 88 is recycled through the chamber 86, the conduit 90 and to the cooling means 70 wherein it is cooled. Normally, the humidity of the first atmosphere 88 will be in the desired range. If the potatoes are dry, the humidity of the first atmosphere 88 will be approximately 96 to 98 percent relative humidity. Therefore, it will not be necessary to add water to the adjusted atmosphere passing through the humidifying section 72.

With the above information in mind, assume that the humidity of the first atmosphere 88 is in the range of approximately 96 percent relative humidity to about 98 percent relative humidity; that the temperature of the first atmosphere 88 is in the range of about 45°F. to about 50°F.; and, that the temperature of the second atmosphere 92 is in the range of about 1°F. to approximately 10°F. less than the temperature of the first atmosphere 88. Probably, the relative humidity of the second atmosphere 92 will be less than about 96 percent relative humidity. In fact, the relative humidity of the second atmosphere 92 will be, considerably, less than about 96 percent relative humidity. Under these circumstances, the cooling means 70 will not be operated to cool the recycled first atmosphere 88. Instead, the motor 78 will open the damper or louver 76 so as to bring in outside air or the second atmosphere 92. The second atmosphere 92 will be treated in the humidifying section 72 so as to add moisture. Also, the heater 72 will not be used as the purpose of the second atmosphere 92 is to absorb some of the heat given off by the potatoes in storage. The second atmosphere 92 in passing through the humidifying section 72 will be so treated as to raise its relative humidity to a value in the range of about 96 percent relative humidity to about 98 percent relative humidity so as to form the adjusted atmosphere which will pass through the chamber 80 and blown through the plenum 40 and out into the first atmosphere 88. In this manner the temperature of the first atmosphere 88 is lowered by the introduction of the adjusted atmosphere, at a lower temperature than the temperature of the first atmosphere 88, so as to absorb some of the heat given off by the potatoes in storage. With the introduction of the second atmosphere 92 into the control unit 34 and into the first atmosphere 88 there is built up a positive pressure of the first atmosphere 88 in the storage warehouse 20. This positive pressure of the first atmosphere 88 with respect to the second atmosphere 92 means that, in time, some of the first atmosphere 88 must be vented outside of the storage warehouse 20. In the storage warehouse 20 are gravity operated dampers 100. With the increase of the pressure of the first atmosphere 88 with respect to the second atmosphere 92 the gravity operated dampers will open so as to allow some of the first atmosphere 88 to escape from the storage warehouse 20. From this, it is seen that, when the temperature of a second atmosphere 92 is at a proper differential with respect to the temperature of the first atmosphere 88 it is possible to use the second atmosphere 92 to cool the first atmosphere 88. Naturally, if the potatoes are being stored at a temperature in the range of approximately 38°F. to about 40°F., the temperature of the second atmosphere 92 will be from about 1°F. to approximately 10°F. colder than the first atmosphere 88.

If the adjusted atmosphere is at too low a temperature then the fan 84 cease to operate, the cooling means 70 ceases to operate, and the humidifying means 72 ceases to operate. For example, if the temperature of the adjusted atmosphere in the plenum 40 falls below approximately 35°F. then these means cease to operate and the atmosphere 88 is not recirculated. One of the reasons for the adjusted atmosphere in the plenum 40 falling below approximately 35°F. would be from a malfunction of the motor 78 and the holding open of the damper or louver 76, and with the second atmosphere 92 at a temperature much lower than about 35°F. Another reason would be a break in the storage warehouse 20 and with a cold second atmosphere 92 entering the plenum 40 or the storage warehouse 20. In this instance the cooling and humidifying means as well as the blowing means would cease to operate. As is seen, this is a safety factor for preventing too cold a first atmosphere 88 in the storage warehouse 20. With too cold a first atmosphere 88 in the storage warehouse 20 damage may be inflicted upon the potatoes in storage.

The effect of humidity on a potato in storage may be considerable. For example, assume that a potato has been damaged while being harvested or damaged while being placed in the storage warehouse 20. Assume, that the skin has been broken and that the body of the potato is exposed. If the relative humidity of the first atmosphere 88 is relatively low, such as approximately 80 percent relative humidity or less, the liquids in some of the solids in the potato will try to form a scab over the bruised area of the potato. With the low relative humidity in the first atmosphere 88 the liquids will evaporate from the bruised area of the potato so as to leave a scab over the bruised area. Unfortunately, it is possible for rot to start forming underneath the scab. In this way, rot has been introduced into the potato. In time, the rot will probably spread. One of the ways to avoid the formation of this scab on the bruised area is to store the potato in the first atmosphere 88 having a high relative humidity in the range of about 96 percent to about 98 percent relative humidity. In this high relative humidity atmosphere the skin of the potato grows back over the bruised area so as to form a continuous skin. As a result, rot it not able to start in the potato. Instead, the potato heals itself with the formation of a new skin. This brings forth the value of a high relative humidity, aside from shrinkage of the potato, and illustrates that the high relative humidity makes it possible for better storage of the potato.

Figure 3:
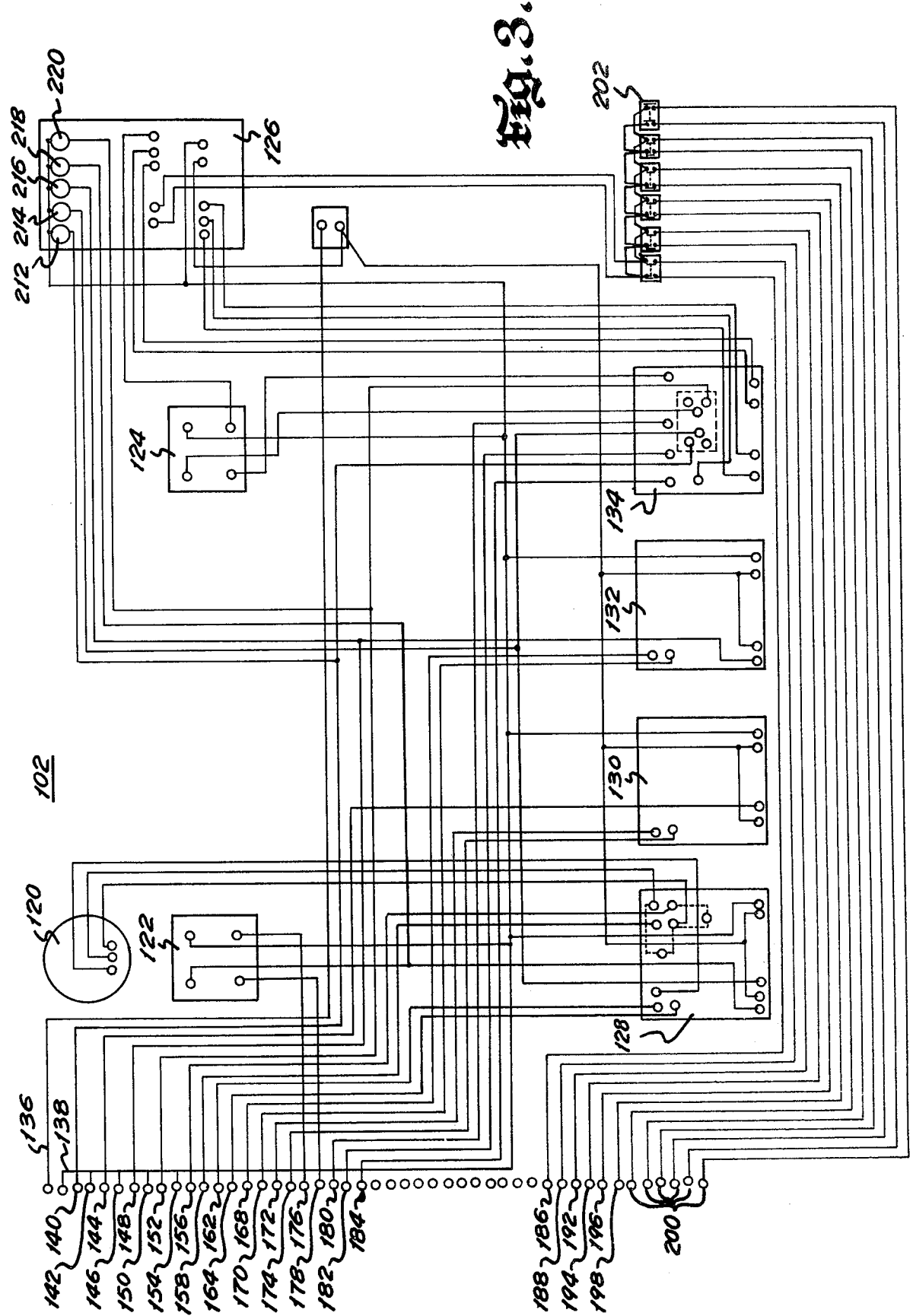
FIG. 3 is a schematic wiring diagram of the apparatus for admitting an outside atmosphere to be processed for humidifying, heating, and cooling to make an adjusted atmosphere for introduction into the storage warehouse.

In FIG. 3 there is illustrated the schematic wiring diagram for controlling the operation of the cooling means 70, the humidifying means 72, the heater 74, and the motor 78 or the damper 76. This schematic wiring diagram 102 shows the various controls for maintaining a substantially constant relative humidity and a substantially constant temperature in the second atmosphere 88.

With reference to FIG. 2, as well as FIG. 3, it is seen that there is an outside air temperature sensor 104, a temperature sensor for the second atmosphere 92.

There is a return temperature sensor 106 for sensing the temperature of the first atmosphere 88 being returned from the storage warehouse 20 and to the control section 34 and the cooling means 70. Also, there is a temperature sensor 108 in the plenum 40 for sensing the temperature of the adjusted atmosphere in the plenum 40. It is to be realized that there are a plurality of temperature sensing means 110 in the storage warehouse 20. These temperature sensing means may be numerous in number and may be in many different locations.

In the humidifying means 72 there is an humidifier 112 or a means for introducing fine droplets or very small droplets of water into the atmosphere passing through the humidifying means 72. The means 112 introduce the droplets in such small size that they are immediately absorbed into the atmosphere.

In the plenum 40 there is a humidity sensing means 114. If the humidity of the adjusted atmosphere in the plenum 40 is not the proper relative humidity or the desired relative humidity then the humidifier 112 in the humidifying means 72 adds water to the atmosphere.

Then, if the humidity of the adjusted atmosphere in the chamber 80 is of the desired relative humidity then the humidifier 112 does not add water to the atmosphere.

Likewise, if the temperature of the adjusted atmosphere in the plenum 40, as sensed by the temperature sensing means 108, is too low a temperature, then the heater 74 is actuated to increase the temperature. Also, if the temperature of the adjusted atmosphere in the plenum 40 is the proper temperature then the heater 74 is not actuated.

Similarly, if the temperature of the first atmosphere 88 in the conduit 90, as sensed by the temperature sensing means 106, is too high a temperature or not the desired temperature, then the cooling means 70 is actuated to cool the temperature of the atmosphere flowing in the conduit 90 and to the cooling means 70. And, if the temperature of the first atmosphere 88 in the conduit 90 is proper temperature then the cooling means 70 is not actuated.

The schematic wiring diagram 102 illustrates the various leads and controls for controlling the operation of the heater 74, the humidifier 112, the cooling means 70, the motor 78 and the damper or louver 76. As is seen in FIG. 102 there is a regulator 120, a 24-volt transformer 122, a transformer 124, an indicating controller 126, a differential controller 128, a temperature controller 130, a relative humidity controller 132 and a master motor 134. The master motor 134 performs, essentially, three functions. The master motor 134 will control the heating circuit for heating the adjusted atmosphere, see heating means 74. The master motor 134 will control the refrigeration means 70 for cooling the first atmosphere 88 to make an adjusted atmosphere. Also, as a third function, the master motor 134 will control the motor 78 for controlling the damper 76 and the incoming air to the cooling means 70.

There is a hot line and contact 136. There is a common line or bus line 138.

The contacts 140 and 142 are for controlling the solenoid valve for the refrigeration unit of the cooling means 70.

The contacts 144 and 146 are for controlling the fan for the low temperature cut-out for the plenum 40. As previously explained, when the temperature of the adjusted atmosphere in the plenum 40 falls below a desired low temperature, approximately, 35°F., the unit is shut off or turned off. One of these aspects is for the fan 84 to be turned off so as to not blow the adjusted atmosphere through the louver 60 and into the plenum 40. There is a low temperature sensing means 108 in the plenum 40.

The contacts 148 and 150 are the humidifier contacts for controlling the humidifier 112.

The contacts 156 and 158 are for an inside air temperature sensor 190 for the first atmosphere 88, see FIG. 2.

The contacts 162 and 164 are for an outside air sensor 166, see FIG. 2.

The contacts 168 and 170 are for the humidity sensor 114.

The contacts 172 and 174 are for the low temperature sensor 108 in the plenum 40, see FIG. 2.

The contacts 176 and 178 connect by means of appropriate lines with the transformer 122, a 24-volt transformer. The contacts 176 and 178 connect with the 24-volt power slave motor 78.

The contacts 180 and 182, and 184 are for slave operating control for the master motor 134 to control the slave motor 78.

The contacts 186 and 188 are for the air tunnel temperature sensor 160. These contacts connect with the indicating controller 126 which in turn connect with the master motor 134. As previously stated the master motor 134 controls the slave motor 78.

The contacts 192 and 194 are for the temperature indicating means 106 in the return conduit 90.

The contacts 196 and 198 are for the outside air temperature indicating means 104.

It is seen that there are a plurality of contacts and lines 200 for connecting with the thermal couples or temperature sensing means 110. It is to be realized that the number of temperature sensing means 110 and contacts 200 can vary. In some storage warehouses it may be satisfactory to have three or four or half a dozen such temperature sensing means 110 while in other storage warehouses an operator may desire to have 50 or 100 of these temperature sensing means 110.

As is seen in FIG. 3 in schematic wiring diagram 102 the contacts 154, 150, 146, 144 and 138 are connected in common or connected together.

In FIG. 3 it is seen that the inside air temperature sensor contacts 156 and 158 for temperature sensing means 190 connect with differential temperature controller 128 and that the outside air temperature sensor contacts 162 and 164 also connect with the differential temperature controller 128. When the differential temperature between the second atmosphere 92 and the first atmosphere 88 is the desired difference, the second atmosphere 92 varies from 1°F. to about 10°F. lower in temperature than the temperature of the first atmosphere 88, then the differential controller controls the operation of the master motor 134 so as to control the slave motor 78 and the opening of the damper 76 or louver 76 to allow the second atmosphere 92 to enter into the control housing 34, and into the chamber 80 and into the plenum 40 for blowing into the storage warehouse 20 and into the first atmosphere 88.

The humidity sensor contacts 168 and 170 connect with the relative humidity control 132. In turn, the relative humidity control 132 controls the humidifying means 72 and the humidifier 112. In this regard see humidifying contacts 148 and 150, which connect with the relative humidity control 132, and control the operation of the humidifying means 72 and the humidifier 112.

The low temperature sensor contacts for the temperature sensing means 108 connect with the temperature control 130. When the temperature in the plenum 40 drops below about 35°F. the fan 84 is stopped, and, essentially, the system shuts down and automatically closes the outside air intake dampers 76.

The contacts 140 and 142 are for the refrigeration solenoid valve in the cooling means 70. It is seen that the contact 140 connects with the master motor 134 which controls the operation of the solenoid valve in the refrigeration means 70.

The contacts 144 and 146 are for the low limit temperature cutout for the fan 84. The contact 144 connects with the temperature control 130.

The contacts 152 and 154 for the heat contactor for controlling the heating means 74. The contact 156 connects with the master motor 134. The master motor 134 controls the heating circuit and the heating means 74.

In essence, the contacts 140 and 142 for the refrigeration unit are the power contacts for powering the solenoid valve. The contacts 144 and 146 are for controlling the fan and are the power contacts for powering the fan. The contacts 148 and 150 for the humidifying means are the power contacts for powering the humidifier 112. The contacts 152 and 154 are for the heating means and are the power contacts for operating the heating means 74 or the heater 74.

The contacts 156 and 158 sense the inside air temperature and supply this information into the differential controller 128. As previously stated, the outside air temperature sensor contact 162 and 164 connect with the differential controller 128. The differential controller 128 senses the difference in temperature between the outside second atmosphere 92 and the inside first atmosphere 88 in the storage warehouse 20. With this information the temperature differential controller 128 regulates the motor 78 and the damper 76 for opening and closing the damper 76 in the introduction of second atmosphere 92 into the storage warehouse 20.

There is a bank of switches 202 which connect with the indicating controller 126. The indicating controller is a control unit for maintaining a substantially constant temperature within storage warehouse 20. It is possible by means of the indicating controller 126 to set the temperature at the desired temperature. For example, indicating controller can be set at a temperature of 48°F. By means of a circuitry and the control apparatus as illustrated in FIG. 3 this temperature can be maintained within approximately 1°F. The operator by setting the indicator controller 126 at a desired temperature of, say, 48°F. the apparatus as illustrated in FIG. 3 can maintain the temperature within that 1°F. of 48°F. Likewise, if the temperature is set at 39°F. the apparatus in FIG. 3 will maintain the temperature within 1°F. of 39°F.

The relative humidity control 132 is capable of maintaining the relative humidity of the first atmosphere 88 in storage warehouse 20 within about 1 percent relative humidity. This is possible even though the relative humidity of the first atmosphere is in the range of about 96 percent relative humidity.

Figure 4:
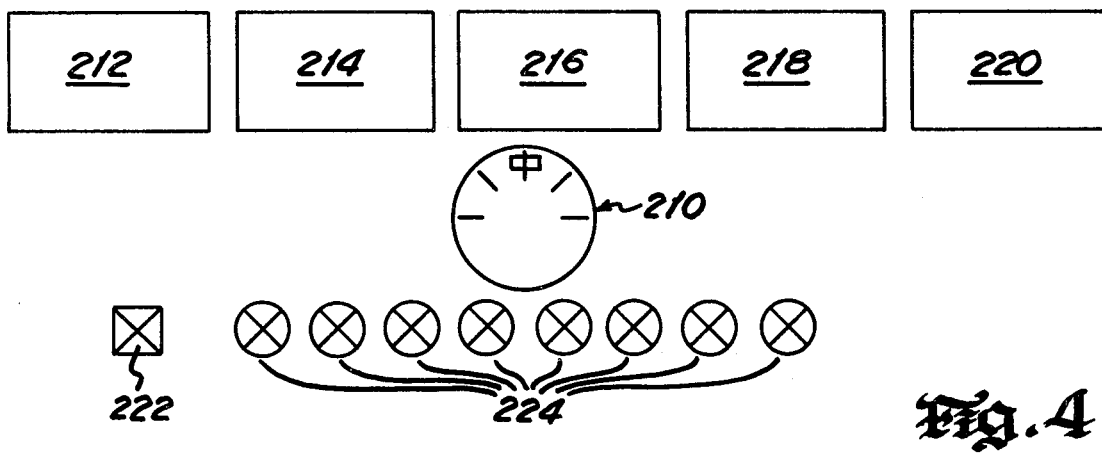
FIG. 4 is a schematic illustration of the control panel for the controls for the adjusted atmosphere; and, FIG. 5 is a schematic illustration of a control panel, inside the control unit, for regulating the adjusted atmosphere for introduction into the storage warehouse.

In FIGS. 4 and FIGS. 2 there are indicating indicia, such as lights, for indicating the controls taking place.

The indicating controller 126 has a dial 210 which can set to the desired temperature, a certain temperature within the range of about 0°F. to approximately 200°F. For example, the temperature may be a temperature within the range of 38°F. to 40°F. for the storage of seed potatoes, or a temperature within the range of 45° to 50°F. for the storage of processed potatoes. It is to be realized that the dial 110 can be set for other temperatures than those indicated.

There is an indicator 212 for indicating if the cooling means 70 is functioning and is in operation.

There is an indicator 214 which indicates if the first atmosphere 88 flowing through the conduit 90 into the cooling means 70 is being cooled by the cooling means 70. In other words, the first atmosphere 88 is being reprocessed so as to cool the first atmosphere 88, as indicated by the indicator 214.

There is a humidifying indicator 216 which indicates if the humidifying means 72 and the humidifier 112 are operating so as to add more moisture to the atmosphere flowing through the humidifying means 72.

There is an indicator 218 for indicating if the first atmosphere 88 is being cooled by air or the second atmosphere 92 flowing through the louver 76 and into the chamber 80. In other words, the first atmosphere 88 in the storage warehouse 20 is being cooled by taking in the outside atmosphere for the second atmosphere 92, which is at a lower temperature than the first atmosphere 88.

There is an indicator 220 for indicating the heating of the atmosphere passing through the heating means 74.

An operator by looking at the control panel for the indicating controller 126 can tell if the refrigeration unit is on or if the atmosphere is being cooled by refrigeration or is being cooled by taking in outside air or an outside atmosphere 92 or can tell if the relative humidity of the atmosphere is being increased or can tell if the atmosphere is being heated.

In FIG. 4 it is seen that there is a master switch 222 and a plurality of switches 224. By depressing the master switch 222 and one of the switches 224 it is possible to tell the temperature of a place or a region in the storage warehouse 20. This means that a person can tell the temperature of the atmosphere 88 in the storage warehouse 20, in one of many different locations. For example, it is possible to tell the temperature at the floor level or 10 feet above the floor level or 5 feet above a floor level or some position near the ceiling, and also, at various positions at floor level at different floor levels.

Figure 5:
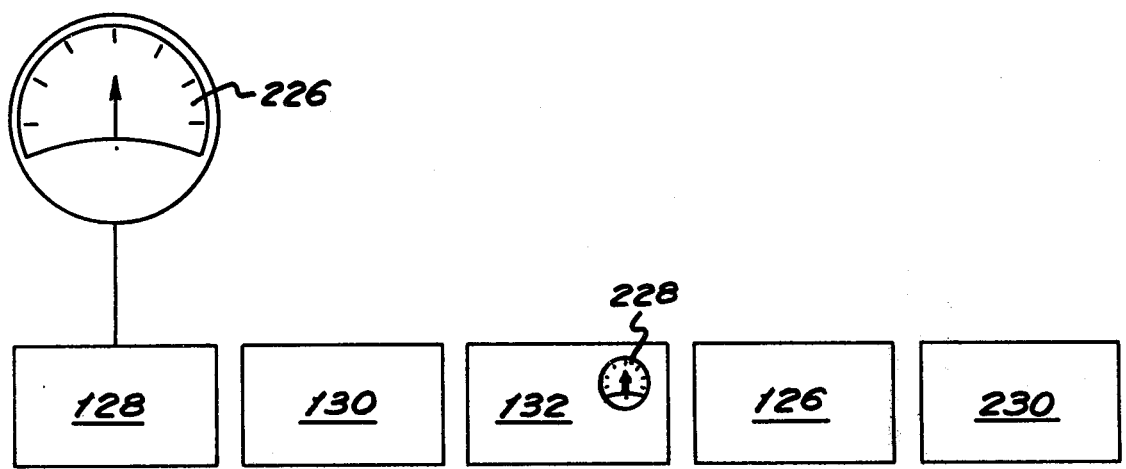

In FIG. 5 there is illustrated an arrangement for the controllers inside of the cabinent for the indicating controller 126. More particularly, there is the differential temperature controller 128 and a dial 226 for this differential temperature controller.

There is the low temperature controller 130.

Also, there is the relative humidity controller 132 and a setting dial 228 for the relative humidity controller 132. It is possible for the operator to set the dial 228 for the desired relative humidity. Normally, the desired relative humidity will be in the range of approximately 96 percent relative humidity to 98 percent relative humidity. The operator can set this dial at 97 percent relative humidity. Then, the controller 132 takes over and controls the relative humidity of the first atmosphere 88 in the storage warehouse 20. It is possible to set the relative humidity to a value of approximately 80 percent.

There is the indicating controller 126.

Finally, there is a control 230 for the controlling the motor 76 and the damper 78.

It is to be realized that the configuration of storage warehouse 20 may be one of many configurations. The storage warehouse 20 may be a relatively small storage warehouse and consist essentially of one wing or one building. The storage warehouse 20 may be a multiplicity of storage warehouses and may consist of many wings. There may be a central corridor with wings on each side of the central corridor. There may be one control station for many wings. If there be one control station for many wings the operator may have many different temperature sensing means 110. There may be a multiplicity of sensing means 110 and each wing of the storage warehouse and there may be a multiplicity of wings. Actually, the size of the storage warehouse 20 will depend upon the needs of the processor. The number of potatoes grown by a processor may be relatively few and size of the storage warehouse relatively small. As contrasted with this many growers of potatoes may group together and build one large storage warehouse. The large storage warehouse then will have a large capacity for storing potatoes and the configuration and need of the warehouse will be different than for one small grower having a relatively small number of potatoes.

The storage conditions for freshly eaten potatoes or potatoes prepared by the housewife may be from a relatively wide range. The temperature may vary in range from about 38°F. to approximately 50°F. However, the relative humidity should be high, in the range of about 96 percent to 98 percent relative humidity.

In the storing of potatoes it was desirable to have a stable temperature. It is possible to store potatoes in a falling temperature. However, it is better to store the potatoes at a stable temperature. It is not desirable to store potatoes in an atmosphere where the temperature fluctuates between a relatively high temperature and a relatively low temperature. The fluctuating temperature brings an undesirable physiological change in the potatoes.

From the foregoing it is seen that the controlling of the atmosphere in the storage warehouse 20 is very easily accomplished. For example, the indicator 220 on the relative humidity control 132 may be set at the desired relative humidity in the range of 96 percent relative humidity to 98 percent relative humidity. Then, the indicating controller 126, and the dial 210, may be set at the desired temperature, say 48°F. Then, the control units, in conjunction with the humidity and temperature sensors, and the heating means 74 the cooling means 70 and the humidifying means 74 adjust the atmosphere 88 in the warehouse to the desired temperature and the desired relative humidity.

What I claim in my invention is:

1. An apparatus to assist in storing potatoes in a first atmosphere in a housing and wherein the atmosphere outside said housing is referred to as a second atmosphere, said apparatus comprising:
  a. means for maintaining the temperature of said first atmosphere in the range of about 35°F. to, approximately, 65°F.;
  b. means for maintaining the relative humidity of said first atmosphere in the range of about 75 percent to, approximately, 99 percent relative humidity;
  c. in maintaining the temperature of said first atmosphere in said housing there being means for recycling and adjusting the temperature of said first atmosphere to form an adjusted first temperature atmosphere and for introducing said adjusted first temperature atmosphere into said housing, and having the capability to blend part of said first atmosphere with said second atmosphere to form a blended temperature atmosphere and for introducing said blended atmosphere into said first atmosphere in said housing;
  d. in maintaining the humidity of said first atmosphere there being means for recycling and adjusting the humidity of said first atmosphere to form an adjusted humidity first atmosphere and for introducing said adjusted humidity first atmosphere into said housing, and having the capability to blend part of said first atmosphere with said second atmosphere to form a blended humidity atmosphere and to introduce said blended humidity atmosphere into said first atmosphere in said housing,
  e. the means for adjusting the humidity of said first atmosphere being capable of adding very fine droplets of water to the atmosphere being introduced into said housing so that the droplets are substantially, immediately, absorbed into the atmosphere; and,
  f. means for introducing the atmosphere into the housing near the floor level of the housing.

2. An apparatus according to claim 1 and comprising:
  a. means for introducing said second atmosphere into the housing to mix with said first atmosphere to maintain the temperature of the first atmosphere in the range of about 35°F. to, approximately, 65°F. and to maintain the relative humidity in the range of about 75 percent to, approximately, 99 percent.

3. An apparatus according to claim 2 and comprising:
  a. means for determining the temperature of the second atmosphere and when said temperature of the second atmosphere is in the range of about 1°F. to, approximately, 10°F. less than the temperature of the first atmosphere, then introducing said second atmosphere into said first atmosphere; and,
  b. in introducing the second atmosphere into the housing means to adjust the relative humidity of the second atmosphere to a relative humidity in the range of about 96 percent to, approximately, 98 percent.

4. An apparatus according to claim 1 and comprising:
  a. said means adjusting and maintaining the temperature and the relative humidity of said first atmosphere in said housing to a temperature in the range of about 35°F. to, approximately, 40°F. and to a relative humidity in the range of about 96 percent relative humidity to, approximately, 98 percent relative humidity.

5. An apparatus according to claim 4 and comprising:
  a. means for introducing said second atmosphere into the housing to maintain the temperature of the first atmosphere in the range of about 35°F. to, approximately, 40°F. and to a relative humidity in the range of about 96 percent relative humidity to, approximately, 98 percent relative humidity.

6. An apparatus according to claim 5 and comprising:
  a. means for determining the temperature of the second atmosphere and when said temperature of the second atmosphere is in the range of about 1°F. to, approximately, 10°F. less than the temperature of the first atmosphere, then introducing said second atmosphere into said first atmosphere; and,
  b. in introducing the second atmosphere into the housing means to adjust the relative humidity of the second atmosphere to a relative humidity in the range of about 96 percent to, approximately, 98 percent.

7. An apparatus according to claim 1 and comprising:
  a. said means adjusting and maintaining the temperature and the relative humidity of said first atmosphere in said housing to a temperature in the range of about 45°F. to, approximately, 50°F. and to a relative humidity in the range of about 96 percent relative humidity to, approximately, 98 percent relative humidity.

8. An apparatus according to claim 7 and comprising:

a. means for introducing said second atmosphere into the housing to maintain the temperature of the first atmosphere in the range of about 45°F. to, approximately, 50°F. and to a relative humidity in the range of about 96 percent relative humidity to, approximately, 98 percent relative humidity.

9. An apparatus according to claim 8 and comprising:
a. means for determining the temperature of the second atmosphere and when said temperature of the second atmosphere is in the range of about 1°F. to, approximamtely, 10°F. less than the temperature of the first atmosphere, then introducing said second atmosphere into said first atmosphere; and,
b. in introducing the second atmosphere into the housing means to adjust the relative humidity of the second atmosphere to a relative humidity in the range of about 96 percent to, approximately, 98 percent.

10. An apparatus according to claim 1 and comprising:
a. means for terminating the recycling of the first atmosphere with said adjusted first temperature atmosphere reaching a temperature less than about 35°F.

11. An apparatus according to claim 1 and comprising:
a. means for terminating the recycling of the first atmosphere with said blended temperature atmosphere reaching a temperature less than about 35°F.

12. An apparatus according to claim 1 and comprising:
a. means for terminating the recycling of the first atmosphere with said adjusted first temperature atmosphere reaching a temperature less than about 35°F. and for terminating the functioning of the means for adjusting the humidity.

13. An apparatus according to claim 1 and comprising:
a. means for terminating the recycling of the first atmosphere with said blended temperature atmosphere reaching a temperature less than about 35°F. and for blocking the introduction of the second atmosphere into said first atmosphere to form said blended temperature atmosphere.

* * * * *